B. HESTNESS.
GRAPE PICKER.
APPLICATION FILED MAR. 5, 1908.
917,063.
Patented Apr. 6, 1909.
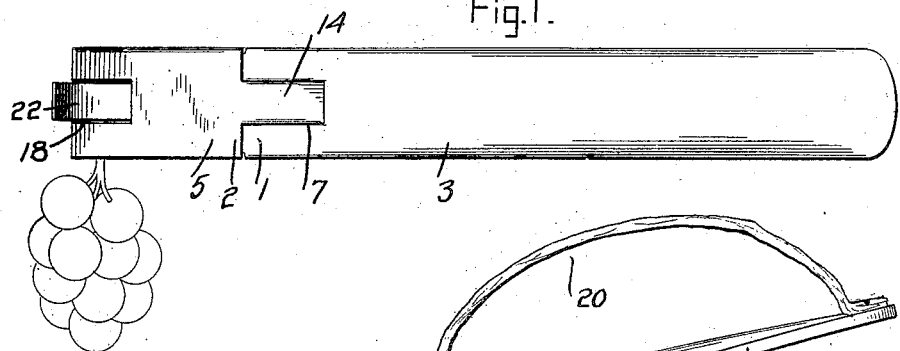
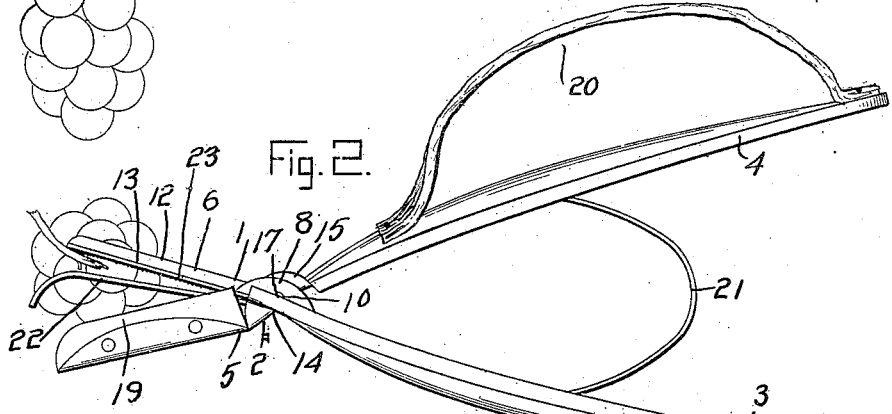
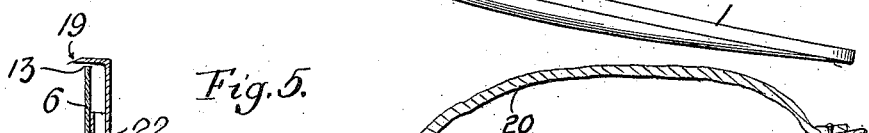
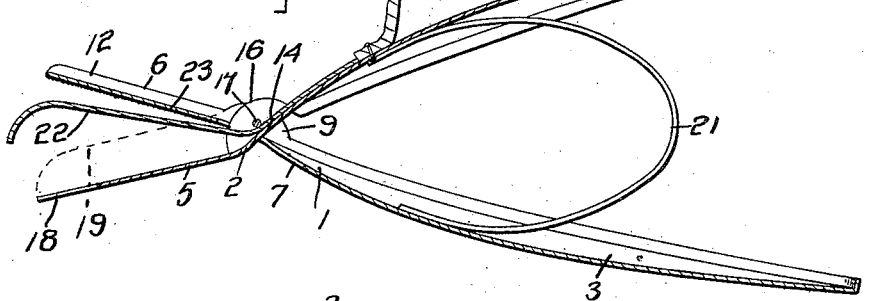
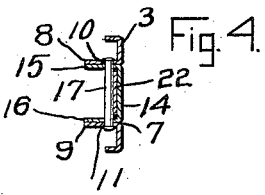
Witnesses
C. K. Reichenbach
C. H. Griesbauer
Inventor
B. Hestness.
By H. B. Willson & Co.
Attorneys
THE NORRIS PETERS CO., WASHINGTON, D. C.

UNITED STATES PATENT OFFICE.

BERNT HESTNESS, OF ROCKFORD, WASHINGTON, ASSIGNOR OF ONE-HALF TO INGEBRET J. BLÄKKAN, OF ROCKFORD, WASHINGTON.

GRAPE-PICKER.

No. 917,063.  Specification of Letters Patent.  Patented April 6, 1909.

Application filed March 5, 1908. Serial No. 419,333.

*To all whom it may concern:*

Be it known that I, BERNT HESTNESS, a citizen of the United States, residing at Rockford, in the county of Spokane and State of Washington, have invented certain new and useful Improvements in Grape-Pickers; and I do declare the following to be a full, clear, and exact description of the invention, such as will enable others skilled in the art to which it appertains to make and use the same.

This invention relates to an improved fruit picker or clipper especially adapted for picking grapes and cherries and which may be used to gather roses and other flowers.

The object of the invention is to produce a simply constructed device of this class provided with means for clipping the fruit and with gripping means for holding it after it has been cut to provide for its being conveyed to a suitable place of deposit with the use of one hand only.

With the foregoing and other objects in view, the invention consists of certain novel features of construction, combination and arrangement of parts, as will be more fully described and particularly pointed out in the appended claims.

In the accompanying drawings:—Figure 1 is a front elevation showing the picker in use with a bunch of grapes held thereby after it has been cut; Fig. 2 is a side elevation of this improved picker with the jaws in opened position; Fig. 3 is a longitudinal section thereof; Fig. 4 is a cross sectional view. Fig. 5 is a transverse vertical section taken through the jaws of the picker.

In the embodiment illustrated, this picker comprises two pivotally connected members 1 and 2 which are arranged to operate scissors-like having handles 3 and 4 at one end and at the other end are provided jaws 5 and 6.

The member 1, as shown, is constructed with an opening 7 arranged longitudinally thereof at the rear of the jaw 6 and this opening is provided at opposite sides with depending lugs 8 and 9 having registering apertures 10 and 11 for a purpose to be described. The jaw 6 is preferably provided at one side with a right angularly projecting out-turned flange 12 to present a blunt or rounded surface to the stem after the fruit is cut and prevent breaking thereof when handling it, and the other side of this jaw 6 has a knife edge 13 for coöperation with the cutting member carried by the jaw 5, as will be hereinafter described.

The member 2 has a reduced neck portion 14 adapted to fit in the opening 7 of the member 1, and is provided with apertured lugs 15 and 16, the apertures therein being adapted to register with the openings 10 and 11 in the lugs 8 and 9 and through which a pin 17 is passed to pivotally connect the members 1 and 2. The jaw 5 of this member 2 is preferably provided at its front edge with a cut out portion 18 for the passage therethrough of the free end of a spring to be described. A knife or cutting member 19 is secured to one edge of the jaw 5 on the side corresponding to the knife edge 13 of the jaw 6. This knife 19 is preferably made of steel and riveted to the jaw 5 or secured in any other suitable manner, for coöperation with the knife edge 13 for cutting the stems of the fruit or flowers to be gathered.

A flexible member 20 is secured at opposite ends to the outer face of the handle 4 of the member 2 and is preferably composed of a strip of leather, canvas or other similar material and is designed to assist in holding the picker in position for use.

A plate spring 21 is secured at its opposite ends to the inner faces of the handle members 3 and 4 at points near their pivotal connection and is bowed intermediately to hold said handles normally apart whereby the jaws are held in similar position.

A spring tongue 22 is fixed at one end to the member 2 preferably on its outer face at the rear of its pivotal connection with the member 1. This tongue is passed under the pin 17 and extends between the jaws 5 and 6 with its free end preferably bent upwardly and adapted to pass through the opening 18 in the jaw 5 when the jaws are closed. This tongue 22 is designed to engage and hold the stem of the fruit after it is cut and clamp it between it and the corrugated inner face 23 of the jaw 6 whereby the fruit is firmly held after being cut and can be carried to the place of deposit without requiring the operator to use his other hand. These members 1 and 2 may be constructed of any suitable material but are preferably made of sheet metal which is especially adapted for constructing cheap devices of this character, it being readily cut and bent as shown in the accompanying drawings.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claims.

I claim as my invention:—

1. A fruit picker comprising two pivotally connected members having jaws at one end, one of said jaws having a rounded edge at one side and a cutting edge at the other side, the other jaw having an inturned right angular cutting member arranged for coöperation with the cutting edge of the other jaw, and a clamping spring lying between the inner face of said jaws to form holding means for the stem of the fruit cut.

2. A fruit picker comprising two pivotally connected members having jaws provided with broad flat faces, one jaw having one side edge bent outwardly at an angle, and the other side edge sharpened to form a cutting blade, the other jaw having an inturned right angularly arranged blade for coöperation with the knife edge on the other jaw, a spring clamping member arranged between the inner faces of said jaws to coöperate with the inner face of one of said jaws to form holding means for the cut fruit.

In testimony whereof I have hereunto set my hand in presence of two subscribing witnesses.

BERNT HESTNESS.

Witnesses:
AMOS R. EATON,
FRED ATHERTON.